(12) United States Patent
Shen et al.

(10) Patent No.: US 10,421,323 B2
(45) Date of Patent: Sep. 24, 2019

(54) METHOD OF ENTERING BASELINE PARAMETERS GLOBALLY IN A MONITOR DISPLAYING TIRE SENSOR READINGS

(71) Applicant: Doran Mfg. LLC, Cincinnati, OH (US)

(72) Inventors: Jie Shen, Shanghai (CN); James Clifford Samocki, Cincinnati, OH (US)

(73) Assignee: DORAN MANUFACTURING, LLC, Cincinnati, OH (US)

( * ) Notice: Subject to any disclaimer, the term of this patent is extended or adjusted under 35 U.S.C. 154(b) by 112 days.

(21) Appl. No.: 15/655,062

(22) Filed: Jul. 20, 2017

(65) Prior Publication Data

US 2019/0023087 A1 Jan. 24, 2019

(51) Int. Cl.
*B60C 23/04* (2006.01)
(52) U.S. Cl.
CPC ............... *B60C 23/0471* (2013.01)
(58) Field of Classification Search
CPC .................................................. B60C 23/0471
See application file for complete search history.

(56) References Cited

U.S. PATENT DOCUMENTS

| 5,748,076 | A * | 5/1998 | Horie ...................... B60C 23/00 340/442 |
| 6,445,287 | B1 * | 9/2002 | Schofield ............ B60C 23/0401 340/442 |
| 6,826,951 | B1 * | 12/2004 | Schuessler, Jr. ........ B60S 5/046 152/152.1 |
| 6,918,289 | B2 * | 7/2005 | Hayashi ............... B60C 23/0401 73/146 |
| 8,009,028 | B2 * | 8/2011 | Uesaka ..................... B60Q 9/00 340/438 |
| 9,233,581 | B2 * | 1/2016 | Fritz .................... B60C 23/0401 |
| 9,505,502 | B2 * | 11/2016 | Miller .................... B64D 47/00 |
| 9,895,943 | B2 * | 2/2018 | Bill ...................... B60C 23/0422 |
| 2003/0058089 | A1 * | 3/2003 | Ruehr ................. B60C 23/0408 340/442 |
| 2003/0197603 | A1 * | 10/2003 | Stewart ............... B60C 23/0416 340/442 |
| 2006/0232391 | A1 * | 10/2006 | Nakatani ............. B60C 23/0408 340/447 |
| 2008/0042817 | A1 * | 2/2008 | Fogelstrom ........... B60C 23/009 340/442 |

(Continued)

*Primary Examiner* — Calvin Cheung
(74) *Attorney, Agent, or Firm* — Dinsmore & Shohl LLP

(57) ABSTRACT

An electronic monitor displays a tire position for each of a plurality of tires on a motor vehicle and provides a warning if a pressure reading received from any of the tires is outside a selected range of the baseline tire pressure value established for that tire position. The tire position and baseline tire pressure value are established by using navigation keys and a pair of control keys on the monitor. In an earlier method of establishing one or more baseline tire pressure values, the baseline value was entered on a tire-by-tire basis. The present improvement enables the operator to enter a baseline value globally for all tire positions. First a tire selection mode is entered, and a tire position is selected. Next, a baseline tire pressure selection mode is entered and a baseline tire pressure value is selected. The baseline tire pressure value is then assigned and saved to all of the tire positions by simultaneously engaging the pair of control keys.

4 Claims, 2 Drawing Sheets

(56) References Cited

U.S. PATENT DOCUMENTS

| | | | |
|---|---|---|---|
| 2008/0051963 A1* | 2/2008 | Kagawa | B60C 23/0416 |
| | | | 701/70 |
| 2009/0199629 A1* | 8/2009 | Matsumura | B60C 23/0408 |
| | | | 73/146.4 |
| 2011/0043343 A1* | 2/2011 | Shepler | B60C 23/007 |
| | | | 340/431 |
| 2014/0184403 A1* | 7/2014 | Kosugi | B60C 23/0416 |
| | | | 340/447 |
| 2015/0061852 A1* | 3/2015 | Fu | B60C 23/0474 |
| | | | 340/442 |
| 2015/0174972 A1* | 6/2015 | Zhou | B60C 23/003 |
| | | | 340/447 |
| 2016/0052351 A1* | 2/2016 | Dilisio | B60C 23/003 |
| | | | 701/36 |
| 2017/0217261 A1* | 8/2017 | Mays | B60C 23/0479 |
| 2018/0178601 A1* | 6/2018 | Surendra | B60C 23/0488 |
| 2018/0222259 A1* | 8/2018 | Janik | B60C 23/003 |
| 2018/0236827 A1* | 8/2018 | Breneman | B60C 23/14 |

* cited by examiner

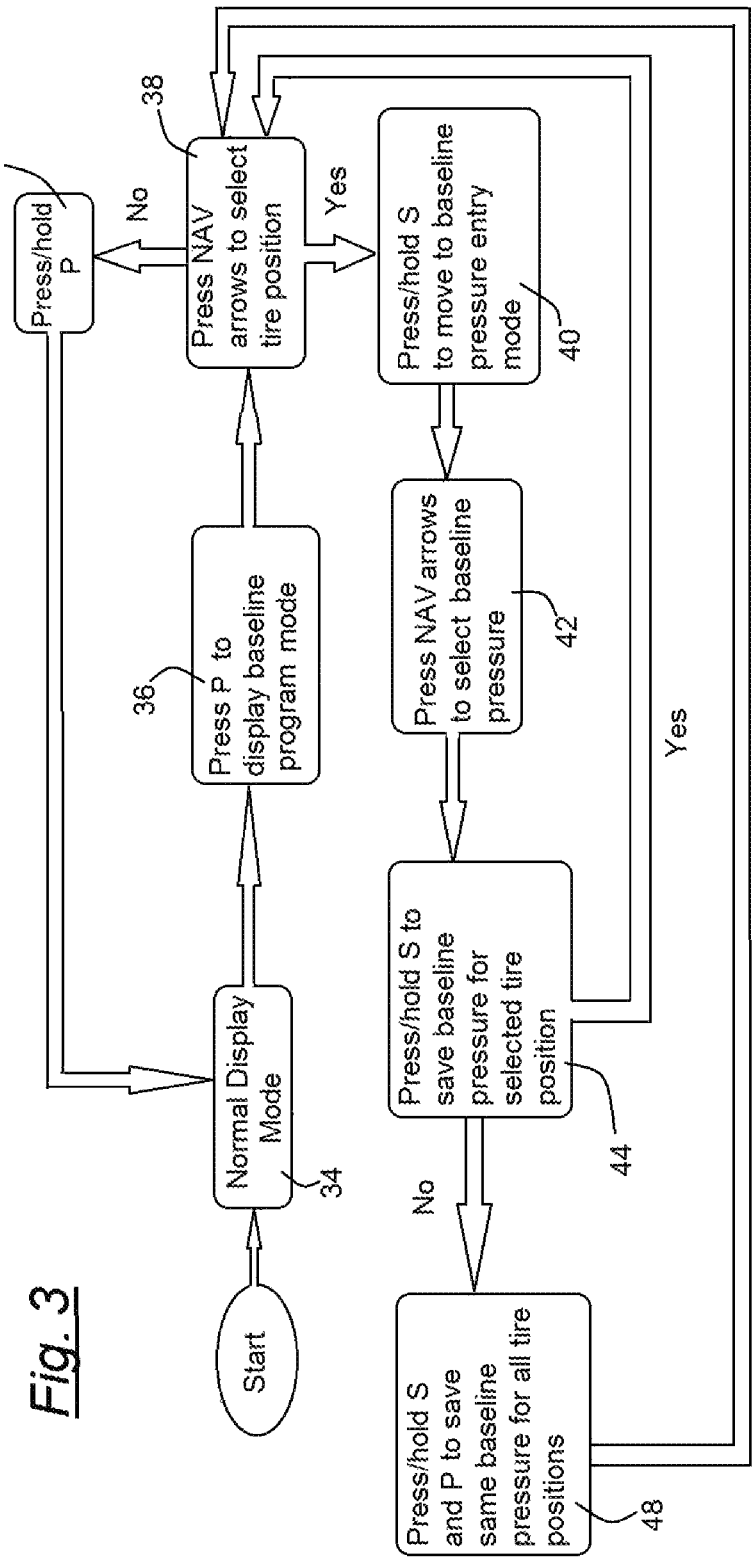

METHOD OF ENTERING BASELINE PARAMETERS GLOBALLY IN A MONITOR DISPLAYING TIRE SENSOR READINGS

BACKGROUND

In order for a tire sensor monitoring system to know when to alert the user that the sensor reading is at a critical level, one or more baseline values must be provided. For example, a baseline tire pressure of 100 pounds per square inch (psi), with a variance of plus or minus 5 psi may be suitable for truck tires. If the sensor on a tire transmits a signal indicating that the actual pressure is 75 psi, the processor in the monitor will compare the actual sensor value with the baseline value. Since the disparity between 75 psi and 100 psi is substantial, the monitor may, in addition to displaying the actual reading, activate an audible and/or visual warning.

Typically, the monitor that displays the tire sensor information is equipped with keys, arrows or a touch screen for entering data. In the past, baseline pressure/temperature values were entered on a tire-by-tire basis. Since a standard North American tractor trailer has 18 tires in contact with the road, entering the baseline parameters was a time-consuming task. If the vehicle included a second semi-trailer, the input process was even longer.

SUMMARY

The present global method is an improvement upon an earlier a method of establishing one or more baseline tire pressure values in an electronic monitor. The monitor is adapted to display a tire position for each of a plurality of tires on a motor vehicle and to provide a warning if a pressure reading received from any of the tires is outside a selected range of the baseline tire pressure value established for that tire position. The tire position and baseline tire pressure value are established by using navigation keys and first and second control keys on the monitor. The present improvement comprises the steps of: entering a tire selection mode on the monitor; selecting a tire position; entering a baseline tire pressure selection mode; entering a first baseline tire pressure value; and assigning and saving the first baseline tire pressure value to all of the tire positions by simultaneously engaging the first and second control keys.

DRAWINGS

FIG. 3 is a flowchart of the present global method of entering baseline pressure data.

DESCRIPTION OF ILLUSTRATIVE EMBODIMENT

Figure 1:
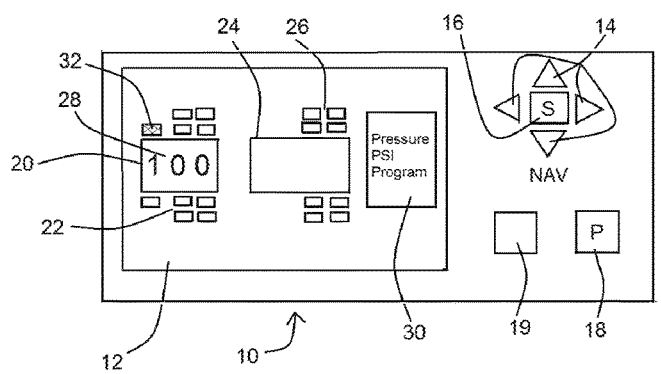
FIG. 1 is a diagrammatic view of the face of a tire sensor monitor.

A tire sensor monitor 10 is typically positioned in the tractor cab for viewing and operation by the driver or other user. As illustrated in FIG. 1, the monitor may be equipped with a display screen 12, a set of four navigation (NAV) arrows or switches 14, and first and second control switches, namely a save (S) switch 16 and a program (P) switch 18, and a warning light 19. The screen may illustrate a cab or tractor 20 and its tires 22 and a trailer 24 and its associated wheels or tires 26. Numerical data 28, such as baseline pressure, may appear within the tractor and/or trailer outlines, and program identification 30 may also be presented onscreen. The P switch 18 may be used to move from one identified program 30 to another. The NAV arrows 14 may be used to navigate a cursor 32 between the displayed tires and to enter data 28 in the tractor and trailer outlines 20, 24. The S button 16 may be used to operatively lock in the values. The warning light 19 may illuminate when the pressure in one or more of the tires deviates significantly from its baseline value.

Figure 2:
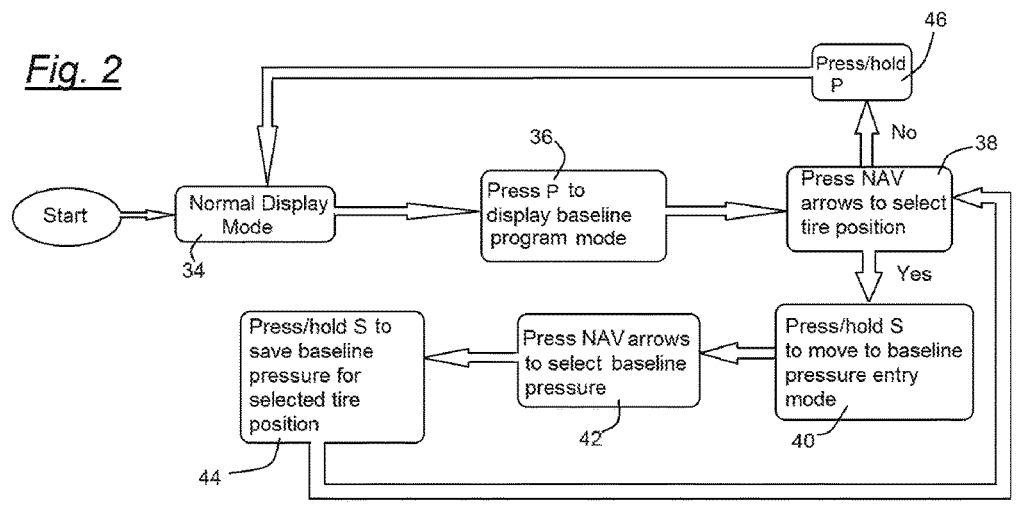
FIG. 2 is a flowchart of a prior art method of entering baseline data in the monitor.

A prior art method of entering baseline pressure data is illustrated in FIG. 2. The process typically began with the display in a normal mode 34. Then, the P button was depressed and released a selected number of times, for instance twice, to reach a tire and pressure selection mode 36. The NAV arrows were then used to select a particular tire position 38. The S switch was then pressed and held for 3 seconds to save the tire position 40. This action caused the first dash or number of the three digit sequence 28 to blink in the center display of the tractor or trailer image (FIG. 1). The navigation buttons were then used to enter a numerical value in the blinking position, whereupon the next value position began to blink 42 and so on until the entry of the selected three digit value was complete. The S button was depressed and held, whereupon the baseline pressure value for the selected tire was saved 44 and the user returned to the navigation step 38 where the NAV buttons were used to select another tire 38, the S button depressed to enter pressure selection mode 40, the nav buttons used to enter the desire pressure value 42, and the S button depressed to save the pressure value 44. This process was repeated until a selected pressure value had been entered for each of the tires. Once completed, the P button would be depressed and held 46 to return to the normal display mode 34.

As illustrated in FIG. 3, the present method of entering baseline pressures globally provides an optional or additional step 48 in the foregoing baseline entry method. In particular, after using the NAV arrows to enter a selected baseline pressure 42, instead of pressing and holding the S button to save the desired pressure to one particular tire position 44, the user has the option of depressing and holding both the S and P buttons simultaneously 48 to save the baseline pressure globally, that is, to all of the tire positions on the vehicle. As may be appreciated, this global option saves time and reduces error over the prior art method.

In addition to setting the same baseline pressure for all of the tire positions, the global step 48 returns the user to the step of using the NAV arrows to select a particular tire position 38 for another baseline pressure, if one is desired. For example, if the baseline pressure for the steering tires should be greater than the pressure at the other tire positions, the following procedure may be employed. First, the NAV buttons are used to move the cursor to one of the steering tires 38. The S button may then be depressed and held for 3 seconds, causing the cursor to flash at the selected steering tire position 40. The NAV arrows may then used to enter a desired baseline pressure value 42. Next, the S button is depressed and held, thereby assigning the new pressure value 44 to the steering tire. The program then returns the user to the navigation of tire position step 38, and the NAV arrows may be used to move the cursor to the other steering tire. The S button is then pressed and held to enter the baseline entry mode 40, and the NAV buttons used to enter the new baseline value 44. The S button is pressed and held to assign the new value 44 to the second steering tire, and the user is returned to the tire position navigation step 38. If there are no more tires that need a baseline pressure that differs from the previously established global value, the user may press and hold the P button 46 to return to the normal display mode 34.

While a particular embodiment of this improved method has been illustrated and described in some detail, the foregoing disclosure is not intended to unduly limit or restrict the scope of the following claims.

The invention claimed is:

1. In a method of establishing one or more baseline tire pressure values in an electronic monitor adapted to display a tire position for each of a plurality of tires on a motor vehicle and to provide a warning if a pressure reading received from any of the tires is outside a selected range of the baseline tire pressure value established for said tire position, said tire position and baseline tire pressure value being established by using navigation keys and first and second control keys, that improvement which comprises the steps of:

entering a tire selection mode;
   selecting a tire position;
   entering a baseline tire pressure selection mode;
   entering a first baseline tire pressure value; and
   assigning and saving the first baseline tire pressure value to all of the tire positions by simultaneously engaging the first and second control keys.

2. The method according to claim 1, and further comprising the steps of:

returning to the tire selection mode;
   selecting a tire position;
   entering the baseline tire pressure selection mode;
   entering a second baseline tire pressure value; and
   assigning and saving the second baseline pressure value to the selected tire position by engaging one of the first and second control keys.

3. The method according to claim 1, and further comprising the step of exiting the tire selection mode by depressing and holding one of the first and second control keys.

4. The method according to claim 1, and further comprising the step of displaying the tire positions and the baseline pressure value on the monitor.

\* \* \* \* \*